United States Patent
Wisseman

(10) Patent No.: US 8,126,330 B2
(45) Date of Patent: *Feb. 28, 2012

(54) DYNAMIC WAVELENGTH SERVICE OVER A ROADM OPTICAL NETWORK

(75) Inventor: Philip Wisseman, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/316,355

(22) Filed: Dec. 11, 2008

(65) Prior Publication Data

US 2010/0150558 A1 Jun. 17, 2010

(51) Int. Cl.
*H04J 14/02* (2006.01)
(52) U.S. Cl. .................. 398/83; 398/2; 398/7; 398/48
(58) Field of Classification Search .............. 398/48–50, 398/83–88, 2, 7
See application file for complete search history.

(56) References Cited

U.S. PATENT DOCUMENTS

2009/0041457 A1* 2/2009 Maki et al. ...................... 398/45
2009/0232497 A1* 9/2009 Archambault et al. ......... 398/50

* cited by examiner

*Primary Examiner* — Leslie Pascal

(57) ABSTRACT

A system and method for dynamically adding/dropping wavelengths in a reconfigurable optical add-drop multiplexer (ROADM) transport network to form a wave division multiplexing virtual private network is disclosed. The system includes at least one optical transponder, a plurality of optical fan-out devices, each arranged to receive an input signal from a network degree and coupled to at least one of a plurality of optical fan-in devices, each optical fan-in device arranged to output a signal to a network degree, the optical fan-out devices comprising at least one wavelength selective switch and the optical fan-in devices comprising at least one wavelength selective switch, the optical fan-out devices and optical fan-in devices being connected so as to enable signals input from each of the plurality of network degrees to be switched to another network degree of the plurality of network degrees; a plurality of demultiplexers for locally dropping selected wavelengths; a plurality of multiplexers for locally adding selected wavelengths; and at least one customer-dedicated fiber switch interposed between the at least one optical transponder and the plurality of demultiplexers and multiplexers. The fiber switch is coupled to wavelengths and degrees that are allocated for a bandwidth-on-demand application. Other configurations include additional fan-in and fan-out devices interposed between a mux/demux assembly and the optical transponders to support wavelength redistribution applications.

6 Claims, 10 Drawing Sheets

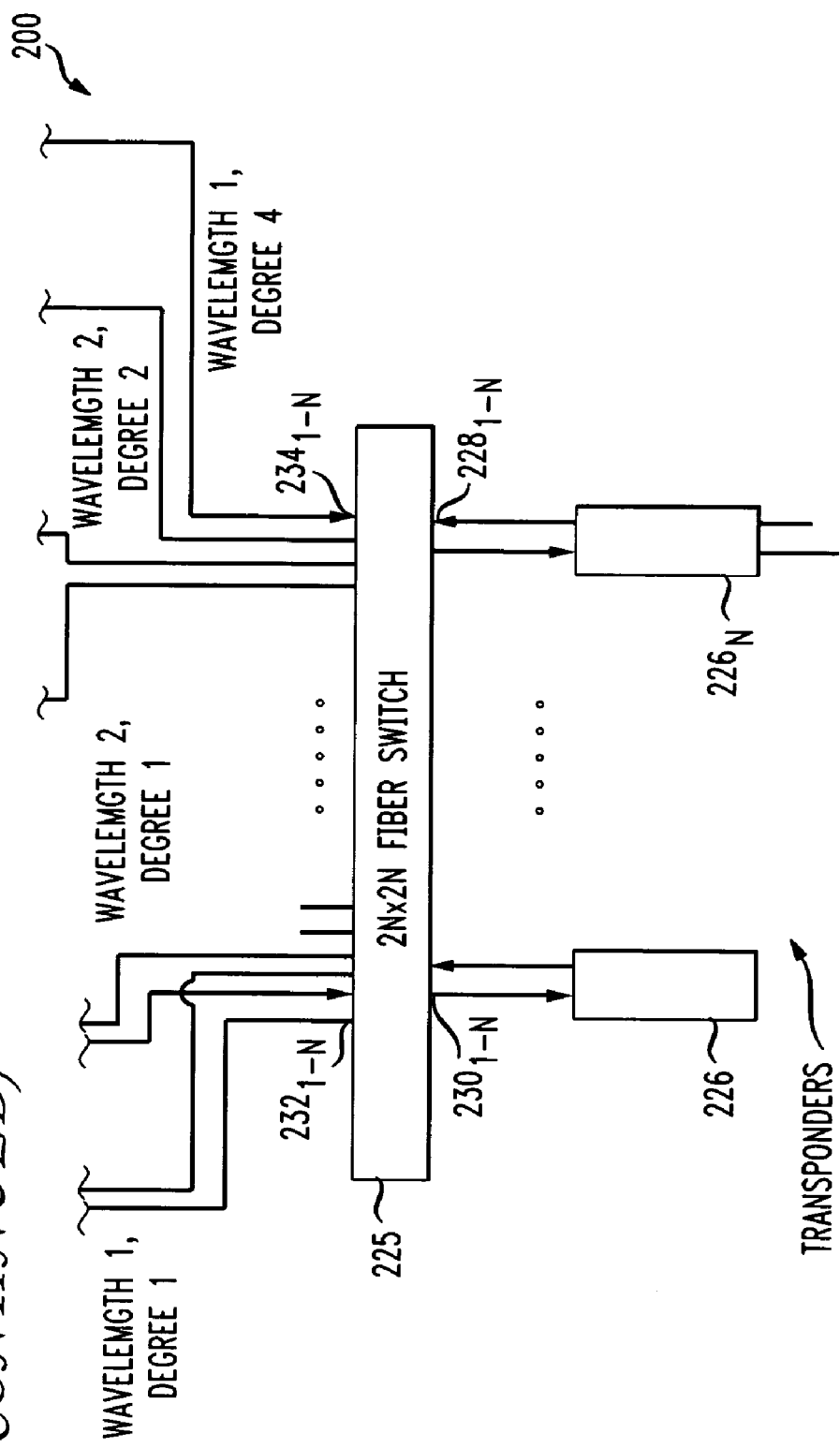

TO FIG.3 (CONTINUED)

DYNAMIC WAVELENGTH SERVICE OVER A ROADM OPTICAL NETWORK

CROSS-REFERENCE TO RELATED APPLICATIONS

This application is related to U.S. application Ser. No. 12/315,911, entitled "Methods for Dynamic Wavelength Add/Drop in a ROADM Optical Network," filed 12/8/2008.

FIELD OF THE INVENTION

The present invention relates generally to optical networks, and more particularly, to a methodology and system for enabling dynamic wavelength service in a reconfigurable add-drop multiplexer (ROADM) optical transport network. Predetermined wavelengths on a shared ROADM are dedicated to a customer to form a dense wave division multiplexing (DWDM) virtual private network (VPN).

BACKGROUND OF THE INVENTION

In less than a decade, the state of the art in fiber-optic transport systems has progressed from simple point-to-point chains of optically amplified fiber spans to massive networks with hundreds of optically amplified spans connecting transparent add-drop nodes spread over transcontinental distances. Cost reduction has been the primary driver for this transformation, and the primary enabler has been the emergence of the reconfigurable optical add/drop multiplexer (ROADM) as a network element (NE).

Exploiting the inherent wavelength granularity of wavelength-division multiplexing (WDM), an optical add/drop multiplexer (OADM) allows some WDM channels (also referred to as wavelengths) to be dropped at a node, while the others traverse the same node without electronic regeneration. Previously, it was necessary to terminate line systems at each node served, and then regenerate the wavelength signals destined for other nodes. The ability to optically add/drop a fraction of a system's wavelengths at a node was first achieved using fixed OADMs. These were constructed from optical filters, and by enabling wavelengths to optically bypass nodes and eliminate unnecessary regeneration, they provided significant cost savings. However, because traffic growth is inherently unpredictable, it is advantageous for the add-drop capability to be reconfigurable.

ROADMs provide many advantages beyond the savings achieved by optically bypassing nodes. In the future, multi-degree ROADMs with adequate reconfiguration speeds may enable shared-mesh restoration at the optical layer. Shared mesh restoration significantly reduces the number of wavelength channels that must be installed as redundant protection circuits. ROADMs also provide operational advantages. Because ROADMs can be reconfigured remotely, they enable new wavelength channels to be installed by simply placing transponders at the end points, without needing to visit multiple intermediate sites. In addition to these cost-saving benefits, ROADMs will enable new services. For example, if transponders are preinstalled, then new circuits can be provided on-demand. The rapid network reconfiguration provided by ROADMs could also become an enabler of dynamic network services, such as switched video for IPTV. For all of these reasons, ROADMs will continue to have a significant effect on the design of optical networks.

Generally, a ROADM is defined as a NE that permits the active selection of add and drop wavelengths within a WDM signal, while allowing the remaining wavelengths to be passed through transparently to other network nodes. Thus, the simplest ROADM will have two line ports (East and West) that connect to other nodes, and one local port (add/drop) that connects to local transceivers. In today's networks, optical links are typically bidirectional, so each line port represents a pair of fibers. When using conventional local transceivers that can process only a single wavelength at a time, the number of fibers in the add/drop port sets the maximum number of wavelengths that can be added or dropped at a given node.

A ROADM with only two line ports (East and West) is referred to as a two-degree ROADM. Practical networks also have a need for multi-degree ROADMs that can serve more than two line ports. In addition to providing local add/drop of from each of its line ports, the multi-degree ROADM must be able to interconnect any individual wavelength from one line port to another, in a reconfigurable way. The degree of a multi-degree ROADM is equal to the number of line-side fiber pairs that it supports (it does not include the number of fiber pairs used in the add/drop portion of the ROADM).

A full ROADM provides add/drop (de)multiplexing of any arbitrary combination of wavelengths supported by the system with no maximum, minimum, or grouping constraints. A partial ROADM only has access to a subset of the wavelengths, or the choice of the first wavelength introduces constraints on other wavelengths to be dropped. The drop fraction of a ROADM is the maximum number of wavelengths that can be simultaneously dropped, divided by the total number of wavelengths in the WDM signal. If a given add or drop fiber is capable of handling any wavelength, it is said to be colorless. If a given add or drop fiber can be set to address any of the line ports (e.g., east or west for a 2-degree ROADM), it is said to be "steerable." A NE can be configured such that no single failure that will cause a loss of add/drop service to any two of its line ports.

Carriers wish to deploy systems in the most cost-effective manner possible. Today, it is far more cost-effective to initially deploy the minimal amount of equipment that can smoothly evolve to meet future needs, rather than to deploy a fully loaded system configuration from the very beginning. Currently and for the foreseeable future, transponders make up the dominant cost of a fully loaded optical communication system. If a full set of transponders were included in the initial deployment, then a substantial cost would be incurred before the network had sufficient traffic to support the expense. Therefore, systems are routinely designed to permit incremental deployment of transponders on an as-needed basis. Similar considerations also apply to multiplexers, although the economic drivers are not as strong. In general, modular growth will be supported whenever the additional cost and complication of upgrading to higher capacity in the future is small compared to the financial impact of a full equipment deployment at startup. By designing this pay-as-you-grow approach into ROADMs, the network itself can grow in a cost-effective manner. Traditional networks grow by adding and interconnecting stand-alone line systems, incurring substantial cost and complexity. By using ROADMs that allow for modular deployment of additional ports, network growth can benefit from both the equipment and operational efficiencies of integrating line systems as they are needed into a seamless network. Because networks are deployed over the course of years, carriers prefer to be able to grow the nodes of the network from terminals or amplifiers into multi-degree ROADMs. This not only allows the expense to be spread out over years, it also enables the network designers to respond to unforeseen traffic growth patterns.

FIG. 1 is a schematic of a prior art multi-degree ROADM system 100 (four network degrees are shown). Each network degree is coupled to a pair of optical amplifiers 102, with an input connected to a 1×N optical fan-in device, i.e., a power splitter (PS) or wavelength selective switch (WSS) 104, and an output connected to a N×1 optical fan-out device, i.e., WSS 106. Multiplexed optical signals on input $108_1$ from network degree 1 are selectively directed via PS/WSS 104 to WSSs 106 and associated outputs $110_2$, $110_3$ and/or $110_4$ for network degrees 2, 3 and/or 4, respectively. In the same manner, multiplexed optical signals on inputs $108_2$, $108_3$ and $108_4$ (network degrees 2, 3 and 4) may be similarly routed to the other network degrees of the system. A plurality of multiplexer/demultiplexer assemblies $112_1$, $112_2$, $112_3$, and $112_4$ are connected to the WSSs 106 and PS/WSSs 104 for locally adding/dropping wavelengths to/from each network degree 1, 2, 3 and 4 by WSSs 106 and PC/WSSs 104. In this implementation, the add/drop wavelengths cannot be redirected between the network degrees to support dynamic wavelength applications such as bandwidth-on-demand, mesh restoration and wavelength redistribution.

An existing ROADM system for providing dynamic add/drop wavelengths uses a degree for the add/drop wavelengths such that the mux/demux is shared among all the other degrees on the node. Another known approach employs a fiber switch that is disposed between the transponders and the mux/demux to provide a centralized transponder manager such that any transponder can be switched to any add/drop port on any degree.

Wavelength level services are currently offered as point-to-point services using a wavelength on a DWDM system or dedicated fiber. The introduction of ROADMs into the network offers the ability to provide these services over a shared infrastructure by eliminating the need to pre-plan wavelength capacity. However, none of the previous solutions have proven to be economically practical, and they all suffer from limited scalability.

In view of the above, there exists a need for a new type of multi-degree ROADM system using customer-dedicated equipment that is specifically adapted for bandwidth-on-demand and mesh restoration.

SUMMARY OF THE INVENTION

In accordance with an aspect of the invention, there is provided a system for creating a wave division multiplexing (WDM) virtual private network (VPN) by dynamically adding/dropping wavelengths in a reconfigurable optical add-drop multiplexer (ROADM) transport network. The system includes a plurality of optical fan-out devices, each arranged to receive an input signal from a network degree and coupled to at least one of a plurality of optical fan-in devices, each optical fan-in device arranged to output a signal to a network degree, the optical fan-out devices comprising at least one wavelength selective switch and the optical fan-in devices comprising at least one wavelength selective switch, the optical fan-out devices and optical fan-in devices being connected so as to enable signals input from each of the plurality of network degrees to be switched to another network degree of the plurality of network degrees; a plurality of demultiplexers for locally dropping selected wavelengths; a plurality of multiplexers for locally adding selected wavelengths; and at least one customer-dedicated fiber switch interposed between at least one optical transponder and the plurality of demultiplexers and multiplexers, the customer-dedicated fiber switch being coupled to wavelengths and degrees to reserve wavelengths for the customer.

The multiplexers and demultiplexers have fixed-wavelength ports, and the at least one transponder is tunable to any wavelength supported by the ROADM.

In one embodiment, the at least one customer dedicated fiber switch is a 2N×2N fiber switch, having input and output ports on each side of the switch.

In an another embodiment, a pair of N×N customer-dedicated fiber switches are employed substituted in lieu of the single 2N×2N switch, with one switch for the added wavelengths and the other switch for the dropped wavelengths. In yet another embodiment, the at least one customer-dedicated fiber switch comprises first and second fiber switches interposed between a plurality of optical transponders and the multiplexers and demultiplexers to provide at least one redundant path through the ROADM. In this expedient, at least one optical transponder includes at least one protection port, the optical transponder with the at least one protection port is coupled to the first fiber switch and the second fiber switch.

In still another embodiment, a pair of optical transponders is respectively connected to the first fiber switch and the second fiber switch, and a Y-splitter couples the pair of optical transponders.

In another embodiment, first and second 1×N fiber switches are employed, with the first fiber switch coupled to the plurality of multiplexers and the second fiber switch coupled to the plurality of demultiplexers. Each multiplexer and demultiplexer comprises a wavelength selective switch, the first and second fiber switches are further coupled to the at least one optical transponder.

In accordance with another aspect of the invention, there is provided a method for creating a WDM VPN by dynamically adding/dropping wavelengths in a ROADM transport network comprising: a plurality of optical fan-out devices, each arranged to receive an input signal from a network degree and coupled to at least one of a plurality of optical fan-in devices, each optical fan-in device arranged to output a signal to a network degree, the optical fan-out devices comprising at least one wavelength selective switch and the optical fan-in devices comprising at least one wavelength selective switch, the optical fan-out devices and optical fan-in devices being connected so as to enable signals input from each of the plurality of network degrees to be switched to another network degree of the plurality of network degrees; a plurality of demultiplexers for locally dropping selected wavelengths; and a plurality of multiplexers for locally adding selected wavelengths. The method comprises: connecting at least one customer-dedicated fiber switch between at least one optical transponder and the plurality of demultiplexers and multiplexers, the customer-dedicated fiber switch being coupled to wavelengths and degrees to reserve wavelengths for the customer.

In accordance with another aspect of the invention, there is provided a method for creating a WDM VPN as described in the foregoing, comprising: connecting pairs of 1×N fiber switches between each of a plurality of optical transponders and the plurality of demultiplexers and multiplexers, each multiplexer and demultiplexer comprising a wavelength selective switch; and provisioning a set of wavelengths for a customer by setting the wavelengths on ports of each 1×N fiber switch and the multiplexers and demultiplexers.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout to the extent possible. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
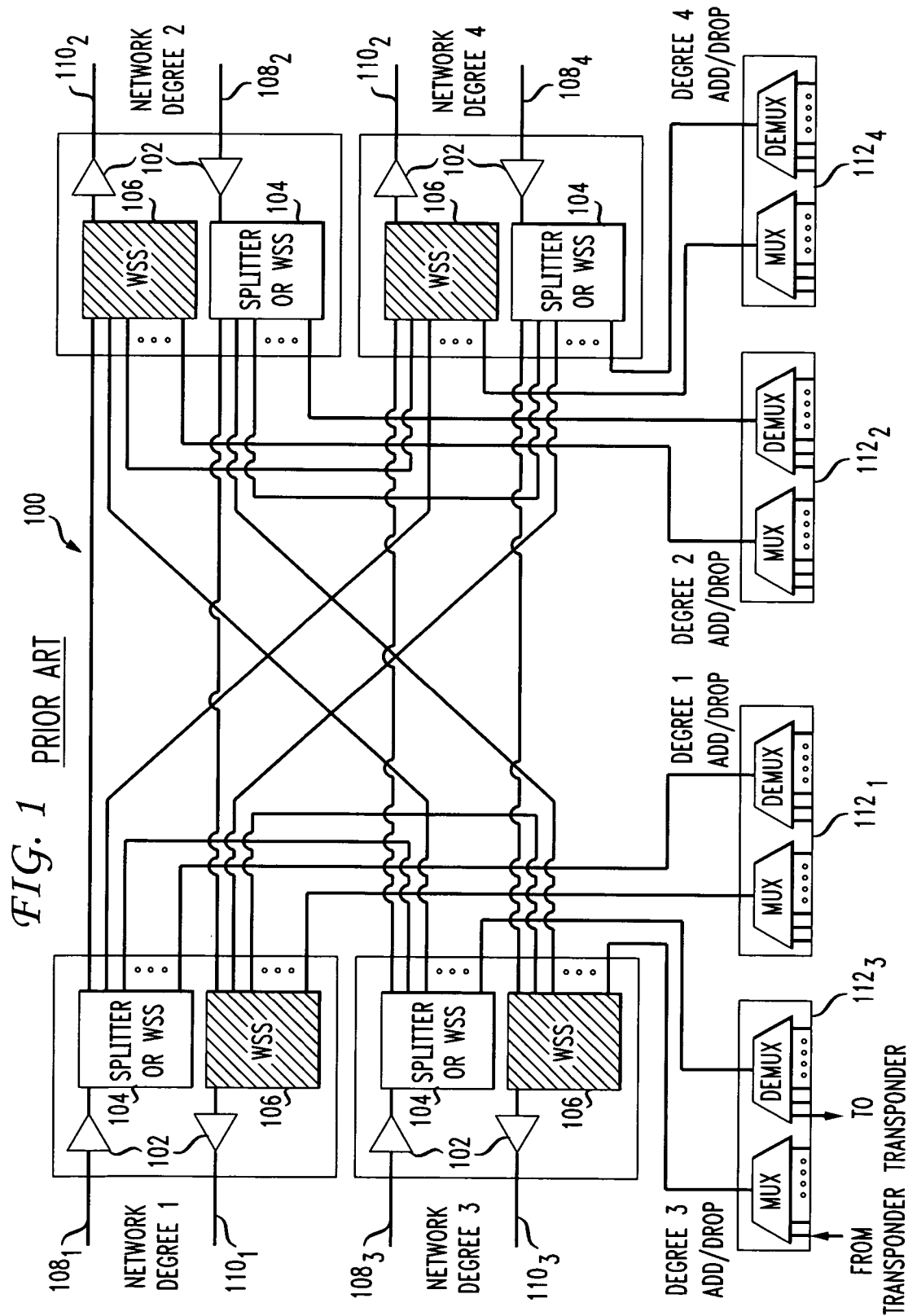
FIG. 1 is a schematic of a prior art system for adding and dropping wavelengths in a multi-degree ROADM transport network.
Figure 2:
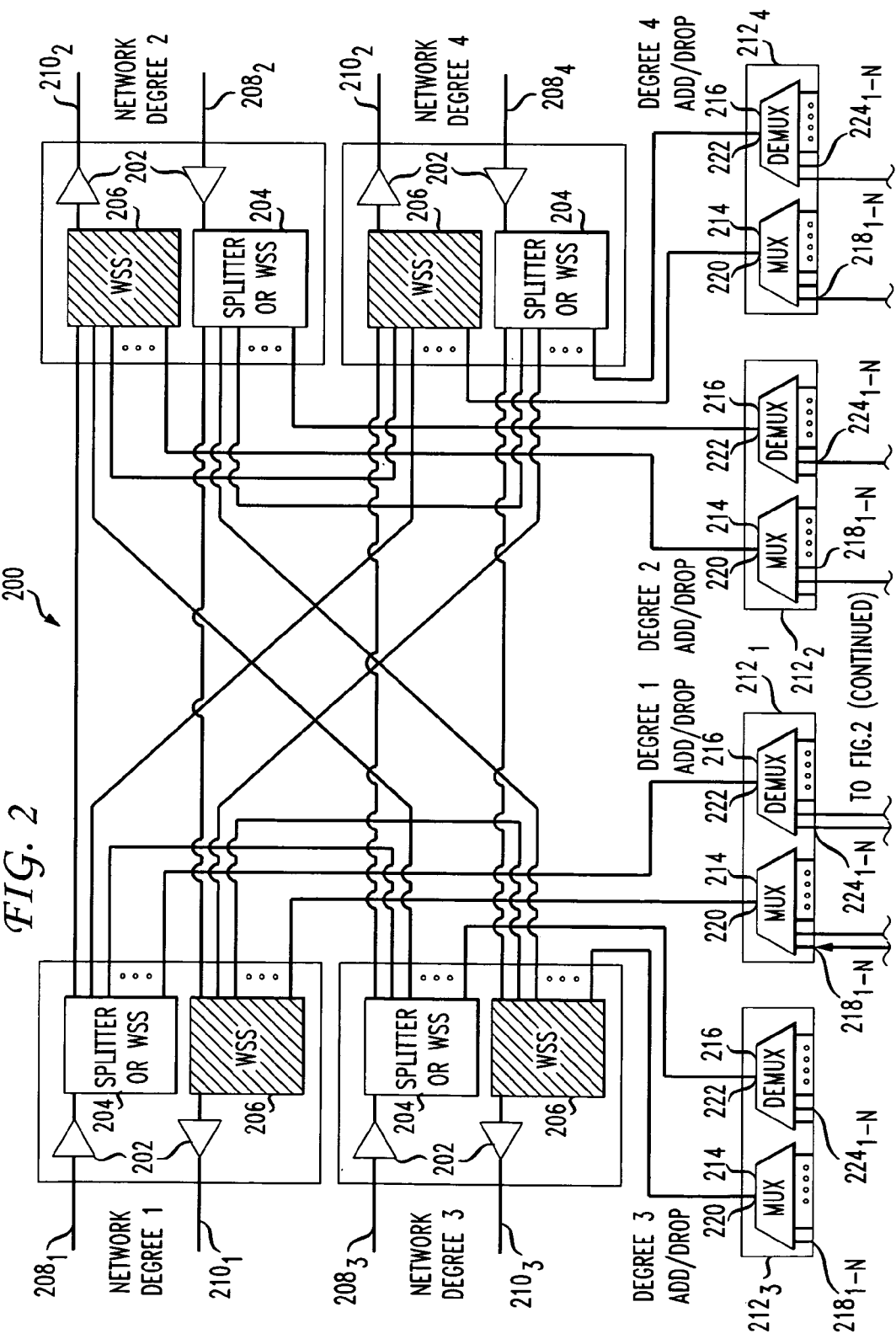
FIG. 2 is a schematic of an exemplary system for dynamically adding/dropping wavelengths in a ROADM transport network utilizing a customer-dedicated 2N×2N fiber switch in accordance with an aspect of the invention.

FIG. 2 is a schematic of an exemplary multi-degree ROADM system 200 in accordance with an aspect of the present invention. Four network degrees are depicted in the figure, with each degree having an input $208_1$, $208_2$, $208_3$, and $208_4$, respectively coupled to an amplifier 202 and a 1×N PS or WSS 204. Similarly, each degree has an output $210_1$, $210_2$, $210_3$ and $210_4$, respectively, coupled to an amplifier 202 and an N×1 WSS 206. As described above, multiplexed optical signals on any of the inputs $208_{1-4}$ may be switched to any of the outputs $210_{1-4}$ by the PSs/WSSs 204 and WSSs 206 serving each network degree. A multiplexer (mux)/demultiplexer (demux) assembly $212_1$, $212_2$, $212_3$ and $212_4$ is respectively connected to each network degree 1-4 to facilitate local add/drop of wavelengths. Each mux/demux $212_{1-4}$ includes a mux 214 and demux 216. The mux 214 comprises a plurality of input ports $218_1$, $218_2$, ... $218_N$, and an output port 220. The demux 216 comprises an input port 222 and a plurality of output ports $224_1$, $224_2$, ... $224_N$. For each network degree, the output port 220 of each mux 214 is connected to one of the N input ports of a respective WSS 206. Similarly, the input port 222 of each demux 216 is connected to one of the N output ports of a respective PS/WSS 204. A 2N×2N fiber switch 225 is disposed between a plurality of optical transponders 226 and the mux/demux assemblies $212_{1-4}$. In accordance with the invention, the fiber switch 225 is constructed and arranged with connections to those wavelengths and degrees that are predetermined to be used for a bandwidth-on-demand (BWoD) application. In the example shown in FIG. 2, wavelengths 1 and 2 are added/dropped to/from network degree 1, wavelength 2 added/dropped to/from network degree 2, and wavelength 1 added/dropped to/from network degree 4. In this regard, each mux/demux $212_{1-4}$ are arrayed waveguide gratings or the like provided with fixed-wavelength ports. The 2N×2N fiber switch 225 can serve N transponders and access/switch up to N wavelengths between the N transponders and the mux/demux assemblies $212_{1-4}$. Each switch 225 can support up to N predetermined bidirectional wavelengths/routes that are established by the fiber connections between the switch 225 and the mux/demux assemblies $212_{1-4}$. As will be appreciated by those skilled in the art, each transponder 226 may be tuned to transmit and receive any wavelength supported by the ROADM system. Wavelengths added at the ROADM are transmitted from each transponder $226_{1-N}$ to one of ports $228_{1-N}$ of fiber switch 225. Similarly, wavelengths dropped at the ROADM are communicated from ports $230_{1-N}$ of fiber switch 225 to the transponders tuned to receive those wavelengths. On the mux/demux side, the added wavelengths are communicated from ports $232_{1-N}$ of fiber switch 225 to the mux/demux, and dropped wavelengths from the selected network degrees are input to the fiber switch 225 at ports $234_{1-N}$. The fiber switch 225 is only deployed at a location and for wavelengths that require dynamic add/drop capabilities. The other wavelengths are supported by using static add/drop. Wavelengths that are shared by multiple locations on a time-share basis may have a fiber switch at some locations and static add/drop at other locations.

Figure 3:
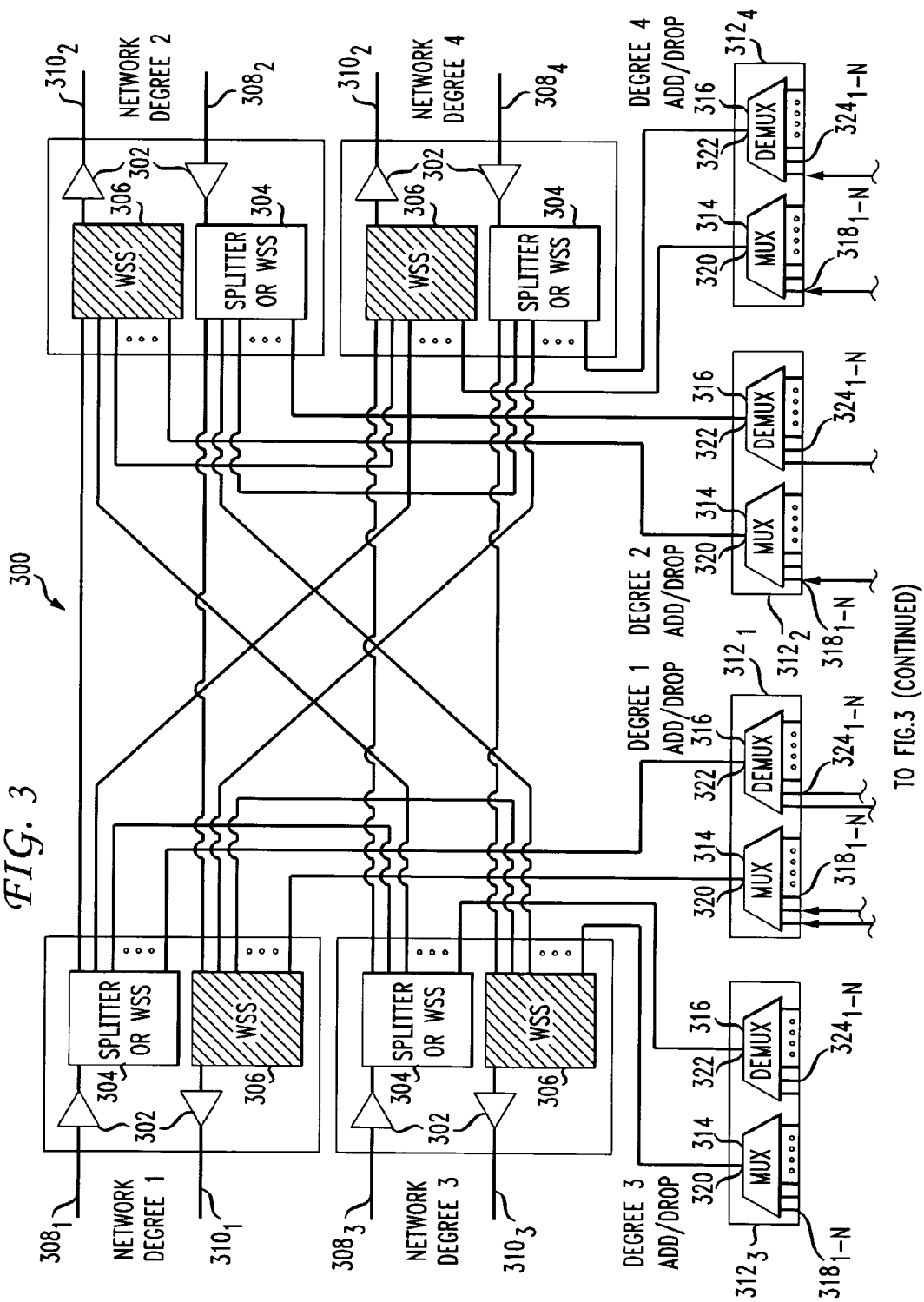
FIG. 3 is a schematic of an exemplary system for dynamically adding/dropping wavelengths in a ROADM transport network utilizing a pair of customer dedicated N×N fiber switches in accordance with another aspect of the invention.
Figure 3:
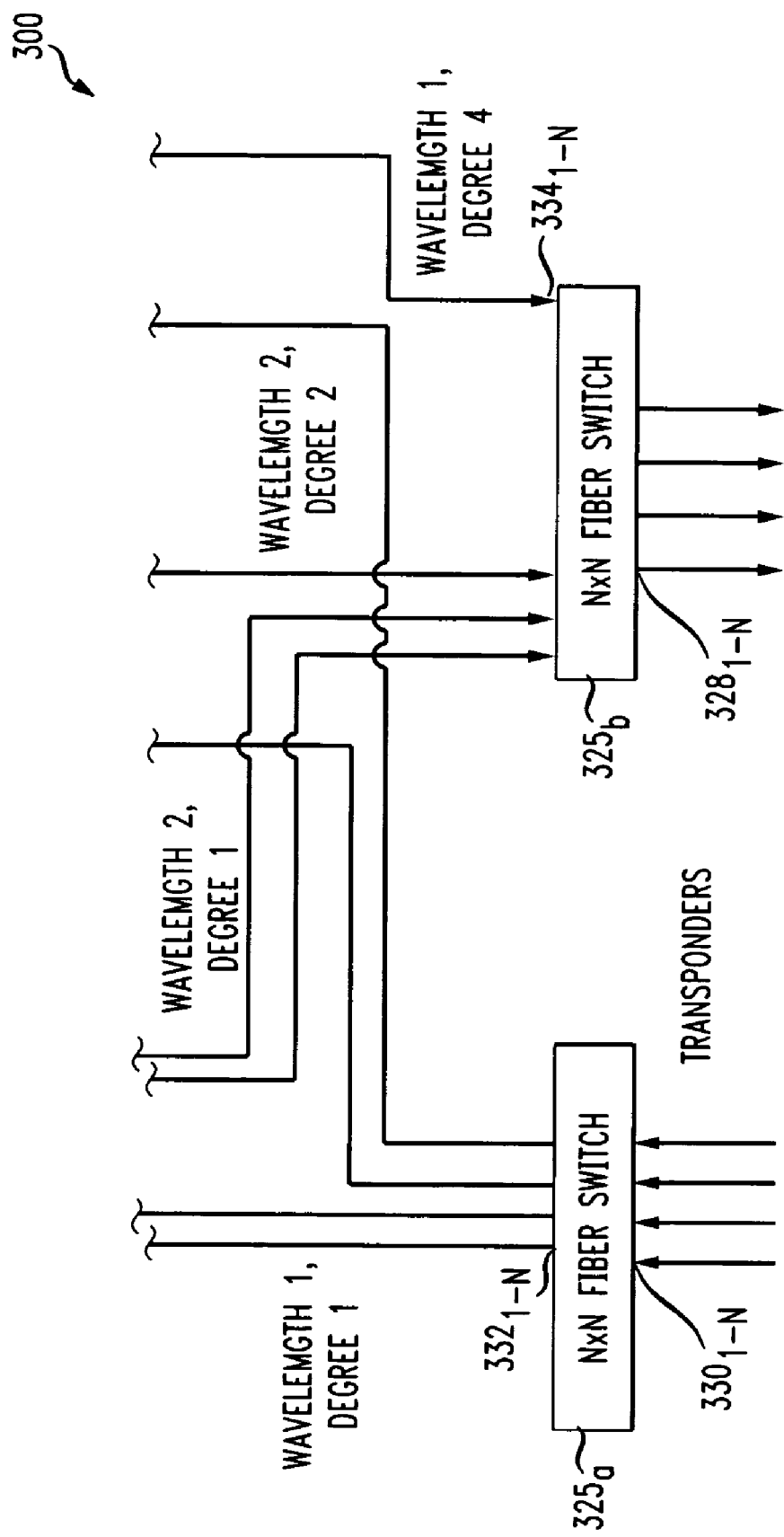

FIG. 3 is a schematic of an exemplary ROADM system 300 in accordance with another aspect of the invention. Four network degrees are depicted in the figure, with each degree having an input $308_1$, $308_2$, $308_3$, and $308_4$, respectively coupled to an amplifier 302 and a 1×N PS or WSS 304. Similarly, each degree has an output $310_1$, $310_2$, $310_3$ and $310_4$, respectively, coupled to an amplifier 302 and an N×1 WSS 306. A mux/demux assembly $312_1$, $312_2$, $312_3$ and $312_4$ is respectively connected to each network degree 1-4 to facilitate local add/drop of wavelengths. Each mux/demux $312_{1-4}$ includes a mux 314 and demux 316. The mux 314 comprises a plurality of input ports $318_1$, $318_2$, ... $318_N$, and an output port 320. The demux 316 comprises an input port 322 and a plurality of output ports $324_1$, $324_2$, ... $324_N$. For each network degree, the output port 320 of each mux 314 is connected to one of the N input ports of a respective WSS 306. Similarly, the input port 322 of each demux 316 is connected to one of the N output ports of a respective PS/WSS 304. In this embodiment, N×N fiber switches 325a, 325b are deployed for the respective add and drop directions. Fiber switch 325a includes a plurality of input ports $330_{1-N}$ on the transponder side and output ports $332_{1-N}$ on the mux/demux side. Similarly, fiber switch 325b includes a plurality of input ports $334_{1-N}$ on the mux/demux side and a plurality of output ports $328_{1-N}$ on the transponder side.

Figure 4:
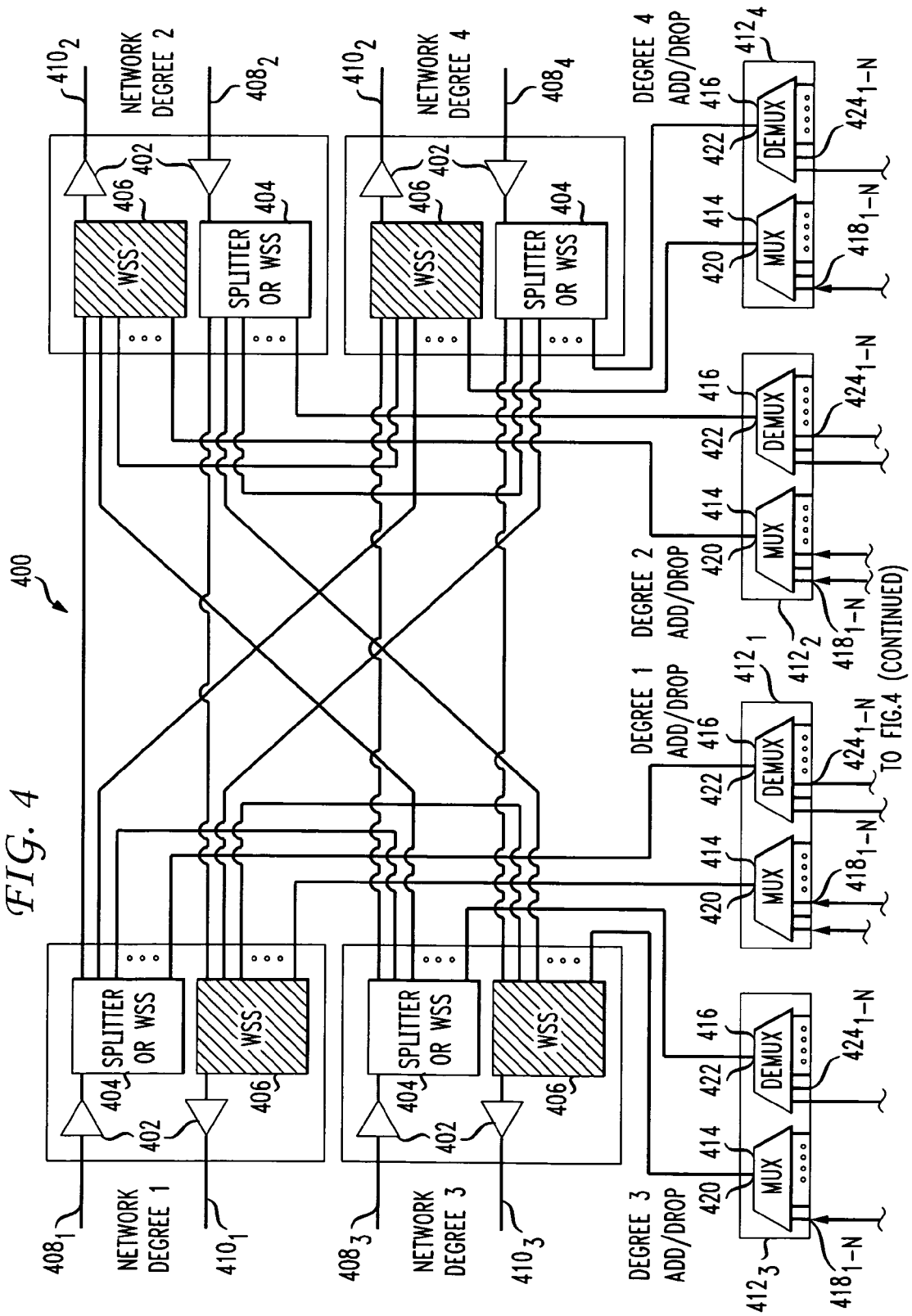
FIG. 4 is a schematic of an exemplary system for dynamically adding/dropping wavelengths in a ROADM transport network utilizing a pair of customer dedicated 2N×2N fiber switches in accordance with an aspect of the invention.
Figure 4:
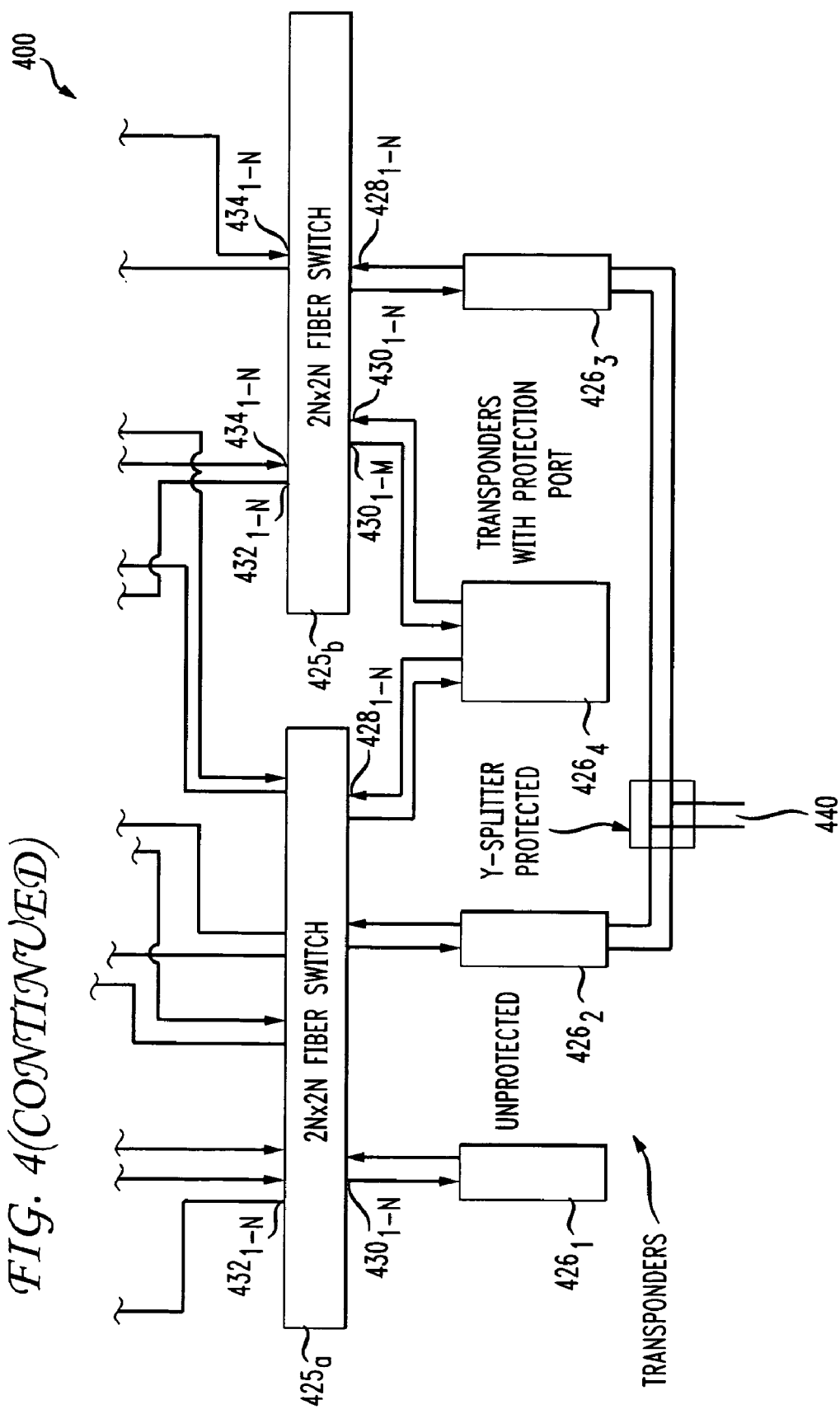

FIG. 4 is a schematic of an exemplary ROADM 400 in accordance with another aspect of the invention. Four network degrees are depicted in the figure, with each degree having an input $408_1$, $408_2$, $408_3$, and $408_4$, respectively coupled to an amplifier 402 and a 1×N PS or WSS 404. Similarly, each degree has an output $410_1$, $410_2$, $410_3$ and $410_4$, respectively, coupled to an amplifier 402 and an N×1 WSS 406. A mux/demux assembly $412_1$, $412_2$, $412_3$ and $412_4$ is respectively connected to each network degree 1-4 to facilitate local add/drop of wavelengths. Each mux/demux $412_{1-4}$ includes a mux 414 and demux 416. The mux 414 comprises a plurality of input ports $418_1$, $418_2$, ... $418_N$, and an output port 420. The demux 416 comprises an input port 422 and a plurality of output ports $424_1, 424_2, \ldots 424_N$. For each network degree, the output port 420 of each mux 414 is connected to one of the N input ports of a respective WSS 406. Similarly, the input port 422 of each demux 416 is connected to one of the N output ports of a respective PS/WSS 404. In this expedient, 2N×2N fiber switches 425a, 425b are employed to provide redundancy. The exemplary system of FIG. 4 includes an unprotected transponder $426_1$, and three protected transponders $426_2, 426_3$ and $426_4$. Transponders $426_2, 426_3$ are coupled to a Y-splitter 440. Transponder $426_4$ includes conventional and protection ports for servicing the same wavelengths through both fiber switches 425a and 425b. For unprotected wavelengths, either switch 425a, 425b may be employed to access any wavelength/degree in the ROADM system 400. As shown, network degree 2 has an add/drop path through both switches 425a, 425b for wavelengths 3 and 1 respectively. Wavelengths added at the ROADM are transmitted from the transponders to one of ports $428_{1-N}$ of fiber switches 425a or 425b. Similarly, wavelengths dropped at the ROADM are communicated from ports $430_{1-N}$ of fiber switch 425a or 425b to the transponders tuned to receive those wavelengths. On the mux/demux side, the added wavelengths are communicated from ports $432_{1-N}$ of fiber switch 425a or 425b to the mux/demux, and dropped wavelengths from the selected network degrees are input to the fiber switch 425a or 425b at ports $434_{1-N}$.

Figure 5:
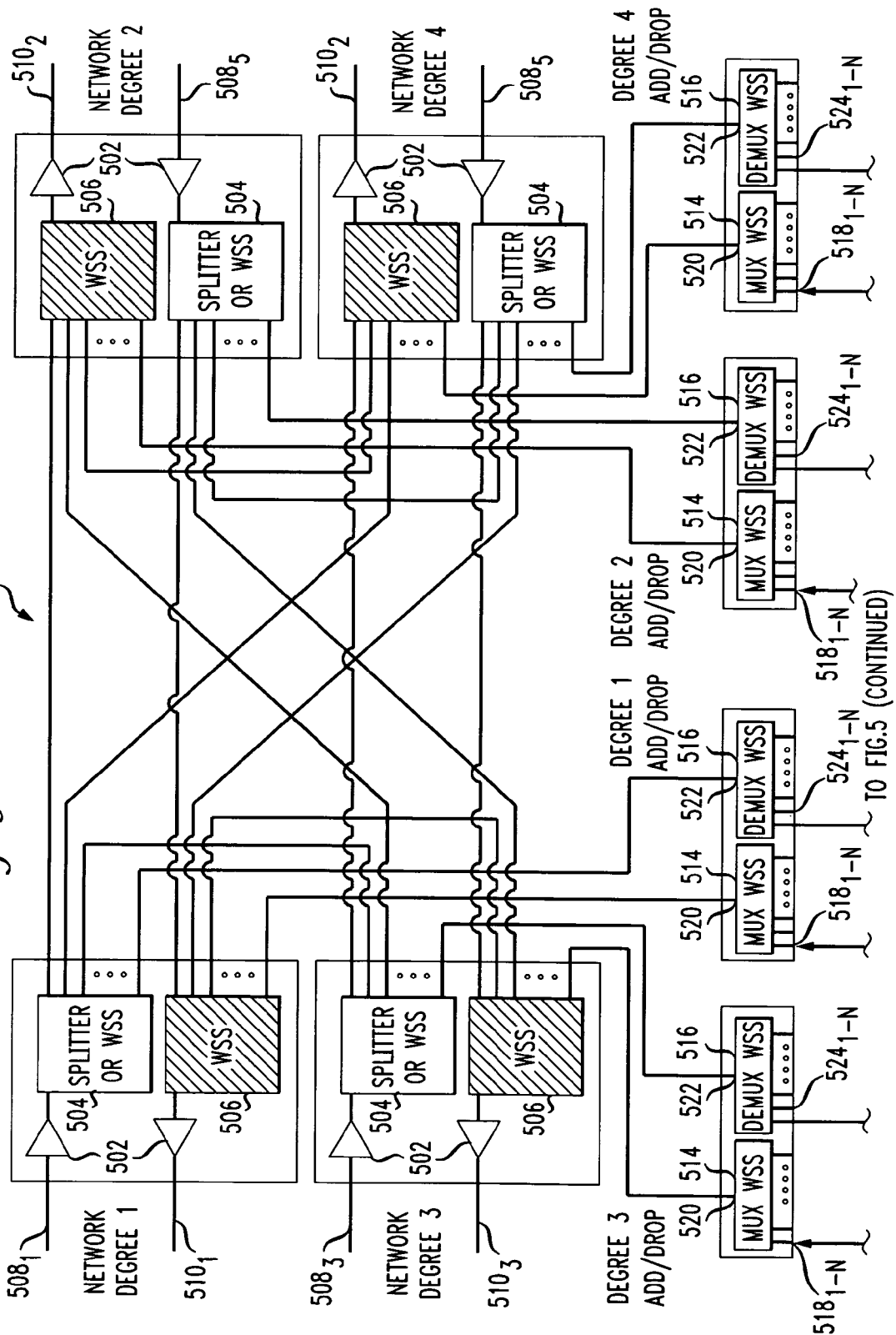
FIG. 5 is a schematic of another exemplary system in accordance with the invention using a pair of 1×N fiber switches for each transponder and provisioning the ports of the switches and the multiplexer/demultiplexer to assign dedicated add/drop wavelengths to a customer.
Figure 5:
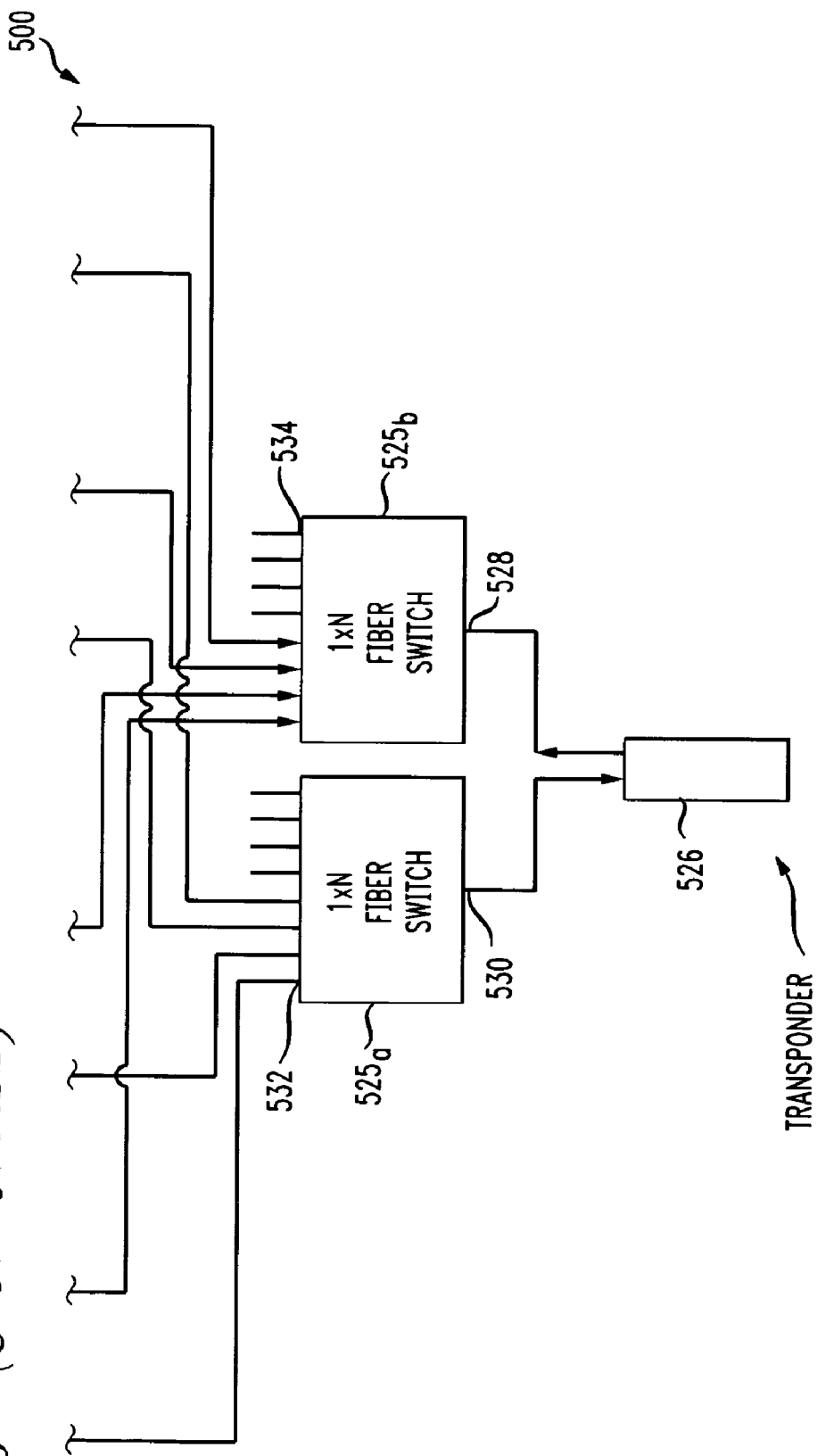

FIG. 5 is schematic of an exemplary ROADM 500 in accordance with another aspect of the invention. Four network degrees are depicted in the figure, with each degree having an input $508_1, 508_2, 508_3,$ and $508_4$, respectively coupled to an amplifier 502 and a 1 X N PS or WSS 504. Similarly, each degree has an output $510_1, 510_2, 510_3$ and $510_4$, respectively, coupled to an amplifier 502 and an N×1 WSS 506. A mux/demux assembly $512_1, 512_2, 512_3$ and $512_4$ is respectively connected to each network degree 1-4 to facilitate local add/drop of wavelengths. Each mux/demux $512_{1-4}$ includes a mux 514 and demux 516. The mux 514 comprises a plurality of input ports $518_1, 518_2, \ldots 518_N$, and an output port 520. The demux 516 comprises an input port 522 and a plurality of output ports $524_1, 524_2, \ldots 524_N$. For each network degree, the output port 520 of each mux 514 is connected to one of the N input ports of a respective WSS 506. Similarly, the input port 522 of each demux 516 is connected to one of the N output ports of a respective PS/WSS 504. In this expedient, a first 1×N fiber switch 525a has a single input port 530 connected to the transmit port of a transponder 526, and a plurality of N output ports 532 that may be coupled to the mux/demux assembly. Similarly, a second 1×N fiber switch 525b has a plurality of input ports 534 that may be coupled to the mux/demux assembly and a single output port 528 that connects to the receive port of transponder 528. As shown, fiber switch 525a is connected to mux 514 for adding wavelength 1 to network degrees 1-4, and fiber switch 525b is connected to demux 516 for dropping wavelength 1 from network degrees 1-4. In this arrangement, the ports can accept any of the wavelengths supported by the ROADM system, and are thus referred to as "colorless." A separate 1×N switch is utilized for the transmit direction (add) and the receive direction (drop) for each transponder 526 that requires dynamic add/drop wavelength capability. Since the add/drop ports are colorless, each transponder can access any wavelength up to N degrees. This configuration may be used either for applications with predetermined wavelengths and routes, or for applications with real-time selection of any wavelength and route. The primary difference from the above implementations is that the connections between the switches and the mux/demux do not have a fixed wavelength association. Accordingly, a DWDM VPN may formed by provisioning a set of wavelengths that can be accessed by a port on the switch or the mux/demux.

Figure 6:
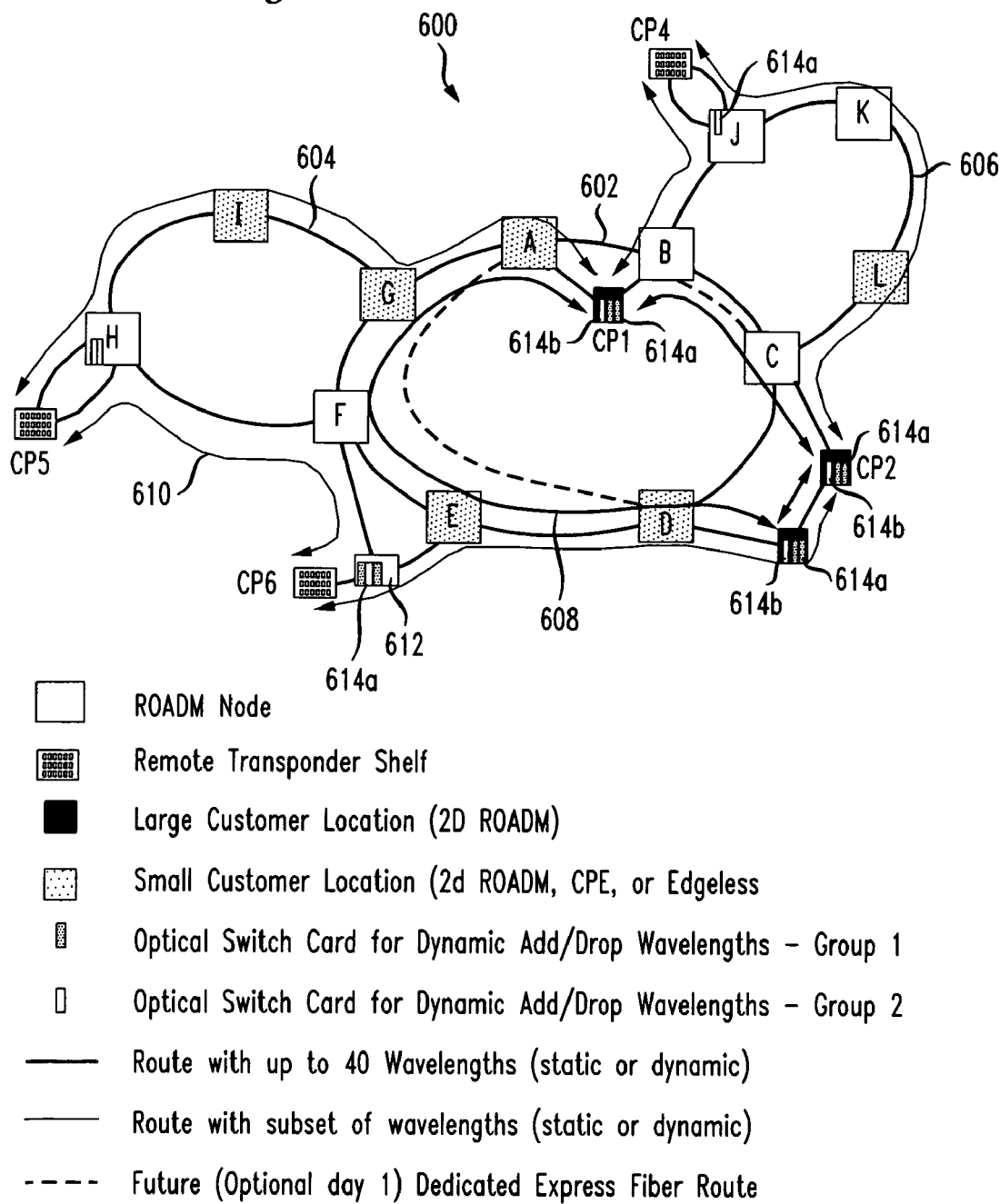
FIG. 6 is a schematic depicting an illustrative wave division multiplexing virtual private network formed by assigning predetermined wavelengths on a shared ROADM transport network in accordance with aspects of the present invention.

In accordance with the embodiments depicted in FIGS. 2-4, the deployment of a customer-dedicated switch automatically reserves wavelengths on a degree of a ROADM node (i.e., the DWDM fiber link into/out of the ROADM node) by provisioning the fiber link from the switch port to a particular mux/demux port. FIG. 6 is a schematic showing how a DWDM VPN 600 can be formed by creating restrictions on the routes available to those wavelengths between different ROADM nodes. These wavelength routing restrictions are required to reserve the assigned customer wavelengths through the network by limiting these wavelengths to express routes (e.g., no add/drop access) at intermediate ROADM nodes. In addition, the available wavelength routes need to be limited to those where the customer's wavelengths have been reserved. These restrictions can be created either within the Operational Support Systems (OSSs), a distributed or centralized Control Plane running on the ROADM network, or a combination of the two depending on the specific OSS and/or Control Plane capabilities and implementation. A customer can then be provided with Customer Network Management (CNM) capabilities to manage the wavelength connections between their locations. With the use of customer-dedicated switches for the dynamic add/drop, BWoD requests can then be made by specifying customer interface ports at each end location, such that the route and wavelength assignment are made automatically by the OSS or Control Plane. Alternatively, additional wavelength capacity management capabilities can be offered by allowing the customer to specify the wavelength and direction out of each location based on the connections to the customer-dedicated switch. This approach ensures that the customer cannot access other wavelengths and that their wavelengths cannot be accessed by other customers, thus forming a DWDM VPN. As shown in FIG. 6, a plurality of ROADM nodes A-H are disposed on rings 602, 604 and 606. "Large" customer locations CP1, CP2 and CP3 (2-degree ROADM) are coupled by a route 608 with up to 40 wavelengths (static or dynamic). The remaining "small" customer locations (2-degree ROADM, customer premises equipment (CPE), or edgeless) CP4, CP5 and CP6 are joined by a route 610 having a subset of wavelengths (static or dynamic). A future dedicated express fiber route 611 couples node A to node D. As shown, CP6 is connected to ROADMs E and F via a remote transponder shelf 612. CP1, CP2, and CP3 are provided with optical switch cards 614a, 614b, for dynamic add/drop wavelengths from two groups, respectively. The remote transponder shelf 612, and ROADM nodes J and H include an optical switch card 614a for dynamic add/drop of wavelengths from the first group. These wavelength routing restrictions are required to reserve the assigned customer wavelengths through the network by limiting these wavelengths to express routes (e.g., no add/drop access) at intermediate ROADM nodes. In addition, the available wavelength routes need to be limited to those where the customer's wavelengths have been reserved. These restrictions can be created either within the Operational Support Systems (OSSs), a distributed or centralized Control Plane running on the ROADM network, or a combination thereof depending on the specific OSS and/or Control Plane capabilities and implementation. A customer can then be provided with Customer Network Management (CNM) capabilities to manage the wavelength connections between their locations. With the use of customer-dedicated switches for the dynamic add/drop, BWoD requests can then be made by specifying customer interface ports at each end location, such that the route and wavelength assignment are made automatically by the OSS or Control Plane. Alternatively, additional wavelength capacity management capabilities can be offered by allowing the customer to specify the wavelength and direction out of each location based on the connections to the customer-dedicated switch. This approach ensures that the customer cannot access other wavelengths and that their wavelengths cannot be accessed by other customers, thus forming a DWDM VPN.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A system for creating a wave division multiplexing virtual private network by dynamically adding/dropping wavelengths in a reconfigurable optical add-drop multiplexer transport network having a plurality of optical transponders comprising:
    a plurality of optical fan-out devices, each arranged to receive an input signal from a network degree and coupled to a plurality of optical fan-in devices, each optical fan-in device arranged to output a signal to a network degree, the optical fan-out devices comprising a wavelength selective switch and the optical fan-in devices comprising a wavelength selective switch, the optical fan-out devices and optical fan-in devices being connected so as to enable signals input from each of a plurality of network degrees to be switched to another network degree of the plurality of network degrees;
    a plurality of demultiplexers for locally dropping selected wavelengths;
    a plurality of multiplexers for locally adding selected wavelengths; and
    a customer-dedicated fiber switch interposed between the plurality of optical transponders and the plurality of demultiplexers and the plurality of multiplexers, the customer-dedicated fiber switch being coupled to wavelengths and degrees to reserve wavelengths for the customer, wherein the customer-dedicated fiber switch comprises first and second fiber switches interposed between a plurality of optical transponders and the plurality of multiplexers and the plurality of demultiplexers to provide a plurality of redundant paths through the reconfigurable optical add-drop multiplexer;
    a pair of the plurality of optical transponders respectively coupled to the first fiber switch and the second fiber switch; and
    a Y-splitter coupled to the pair of optical transponders.

2. The system of claim 1, wherein the plurality of multiplexers and the plurality of demultiplexers have fixed-wavelength ports, and the plurality of optical transponders is tunable to any wavelength supported by the reconfigurable optical add-drop multiplexer.

3. The system of claim 1, wherein the customer-dedicated fiber switch is a 2N×2N fiber switch.

4. The system of claim 1, further comprising an optical transponder having a protection port, the optical transponder with the protection port being coupled to the first fiber switch and the second fiber switch.

5. A method for creating a wave division multiplexing virtual private network by dynamically adding/dropping wavelengths in a reconfigurable optical add-drop multiplexer (ROADM) transport network comprising: a plurality of optical fan-out devices, each arranged to receive an input signal from a network degree and coupled to a plurality of optical fan-in devices, each optical fan-in device arranged to output a signal to a network degree, the optical fan-out devices comprising a wavelength selective switch and the optical fan-in devices comprising a wavelength selective switch, the optical fan-out devices and optical fan-in devices being connected so as to enable signals input from each of a plurality of network degrees to be switched to another network degree of the plurality of network degrees; a plurality of demultiplexers for locally dropping selected wavelengths; and a plurality of multiplexers for locally adding selected wavelengths, comprising:
    connecting a customer-dedicated fiber switch between a plurality of optical transponders and the plurality of demultiplexers and the plurality of multiplexers, the customer-dedicated fiber switch being coupled to wavelengths and degrees to reserve wavelengths for the customer; wherein the customer-dedicated fiber switch comprises first and second fiber switches interposed between a plurality of optical transponders and the plurality of multiplexers and the plurality of demultiplexers to provide a plurality of redundant paths through the reconfigurable optical add-drop multiplexer, a pair of the plurality of optical transponders respectively coupled to the first fiber switch and the second fiber switch, and a Y-splitter coupling the pair of optical transponders.

6. The method of claim 5, wherein the customer-dedicated fiber switch is a 2N×2N fiber switch.

* * * * *